United States Patent [19]

Defendini

[11] Patent Number: 5,379,146
[45] Date of Patent: Jan. 3, 1995

[54] ELECTROCHROMIC PANE

[75] Inventor: Francis Defendini, Rueil Malmaison, France

[73] Assignee: Saint-Gobain Vitrage International, Courbevoie, France

[21] Appl. No.: 53,351

[22] Filed: Apr. 28, 1993

[30] Foreign Application Priority Data

Apr. 28, 1992 [FR] France ................... 92 05246

[51] Int. Cl.[6] ............................................. G02F 1/01
[52] U.S. Cl. .................................. 359/275; 359/265; 359/273; 359/274
[58] Field of Search ............... 359/265, 273, 274, 275

[56] References Cited

U.S. PATENT DOCUMENTS

| | | | |
|---|---|---|---|
| 5,124,833 | 6/1992 | Barton et al. | 359/273 X |
| 5,231,531 | 7/1993 | Defendini et al. | 359/270 X |
| 5,244,557 | 9/1993 | Defendini et al. | 359/274 X |

FOREIGN PATENT DOCUMENTS

| | | |
|---|---|---|
| 0373020 | 6/1990 | European Pat. Off. . |
| 0408427 | 1/1991 | European Pat. Off. . |

OTHER PUBLICATIONS

Applied Physics Letters vol. 37, No. 1 Jul. 1980, New York US pp. 106–108 G. Beni Short–Circuit Memory in Electrochromic Displays.
Patent Abstracts of Japan vol. 17, No. 305 (p-1380) Jul. 6, 1992 & JP-A-40 83 234 (Osaka Gas) Mar. 17, 1992.
Patent Abstracts of Japan vol. 13, No. 395 (P927)4 Sep. 1989 & JP-A-11 42 621 (Toppan Printing) 5 Jun. 1989.
Patent Abstracts of Japan vol. 10, No. 157 (p-464)6 Jun. 1986 & JP-A-61 011 727 (Nissan Jidosha) 20 Jan. 1986.

*Primary Examiner*—Eugene R. LaRoche
*Assistant Examiner*—Do Hyun Yoo
*Attorney, Agent, or Firm*—Oblon, Spivak, McClelland, Maier & Neustadt

[57] ABSTRACT

The present invention has as its subject an electrochromic pane including two glass sheets (1, 2), each coated with a transparent electrically conducting film (3, 4) and separated by an electrode of electrochromic material (5), an electrolyte (6) and a counter-electrode (7). The electrically conducting films (3, 4) are, on the one hand, connected by current supply leads (8, 9) to an electrical supply system generating a potential difference ($U_1$) according to a desired modification to the coloration of the electrochromic material and, on the other hand, are connected to each other at least at a portion of their periphery by an electrically conducting material (11).

16 Claims, 2 Drawing Sheets

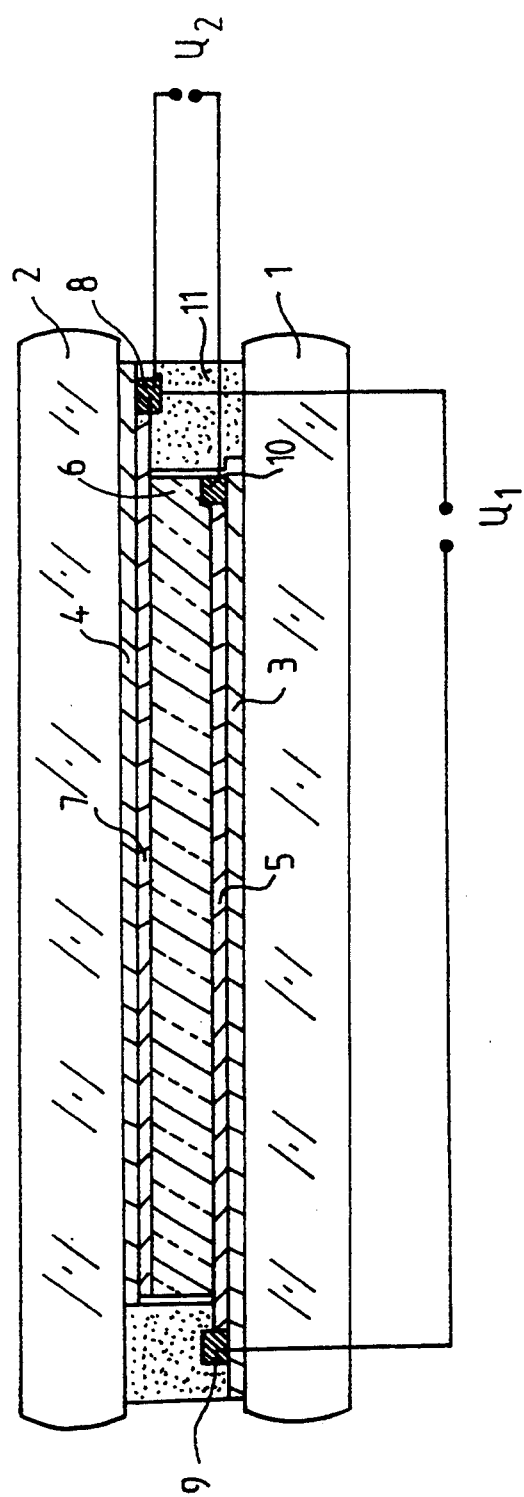
FIG_1

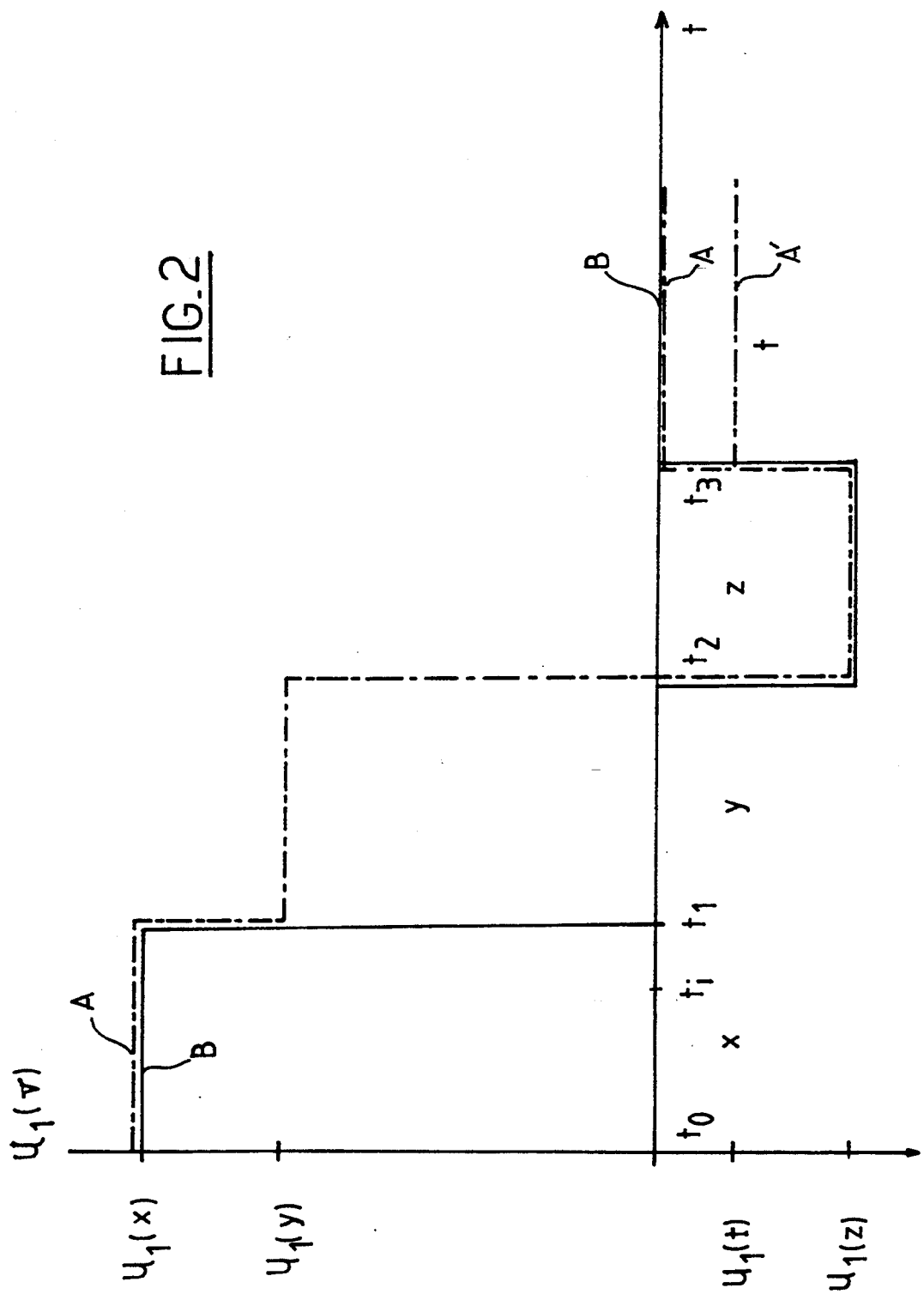

ELECTROCHROMIC PANE

BACKGROUND OF THE INVENTION

1. Field of the Invention

This invention concerns electrically controlled panes of the electrochromic type, that is to say panes in which the coloration can be modified by an electric field.

2. Discussion of the Background

The operating principle of electrochromic panes is based upon the use of a film of a material having an electrochromic property, which is capable of accepting the insertion of cations in a reversible manner, notably $H^+$ protons or lithium cations $Li^+$, thereby passing the film from one degree of oxidation to another, it being well known that each of the degrees of oxidation corresponds to a different coloration state.

For example, tungsten trioxide, virtually colorless in its oxidized state (a) acquires a strong deep blue color in its reduced state (b) by the insertion of protons or $Li^+$ cations according to the following reaction:

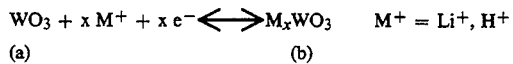

To make these reversible changes of color possible, electrochromic panes comprise two glass substrates, between which are disposed two transparent electrically conducting films equipped with current supply leads, separated successively by an electrode constituted of an electrochromic material, termed a cathodic material, such as tungsten oxide, a counter-electrode, which may also be constituted of an electrochromic material termed anodic, such as iridium oxide or nickel oxide, and a film of electrolyte which makes possible the transfer of the cations in question from one electrode to the other.

By using iridium oxide as a counter-electrode, this material, in contrast to the electrode, is colorless in the reduced state (b) in which $H^+$ protons are inserted and is grayish yellow in the oxidized state (a), where it is deprived of $H^+$ protons, which reinforces the contrast in coloration of the pane, in accordance with the following reaction:

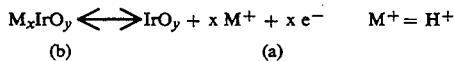

A counter-electrode based upon nickel oxide may, for its part, either insert protons just like iridium oxide, or insert lithium cations, as is known from Patent Application EP-A-0 373 020, with a more complex reaction arrangement implying the existence of several electrochromic equilibrium states.

To express it simply, by applying a potential difference of a desired value and polarity to the two electrically conducting films, a cationic transfer takes place through the electrolyte from one electrode to the other, causing an insertion or de-insertion reaction of the cations and thus a modification to the overall colored appearance of the pane. The perfecting of an electrical supply system is thus crucial for the proper functioning of such a pane. Thus, for example, European Patent Application EP-A-408 427 proposes a supply system which optimizes the switching times of the electrochromic material by providing three current leads in an arrangement of the potentiostat type and applying a potential difference which can be programmed and varied as a function of time. Switching time is to be understood here as meaning the time that elapses during the passage from one given coloration state to another of greater or lesser coloration than the starting one. In this way it is possible to compensate the phenomenon of ohmic drops which appear in the electrically conducting films and are difficult to prevent in the case of large panes.

This document therefore provides for a modulation of the applied potential difference, which enables the degree of coloration and switching time desired to be controlled.

Panes of this type are especially interesting for equipping buildings or vehicles in order to control the solar input and their envisaged applications are tending to diversify widely. A new problem, however, now arises: the proper functioning of the electrochromic pane essentially requires a correct and properly controlled electrical supply.

In the case of a malfunction of the electrical supply, for example in the case of an accidental disconnection of one of the electrical supply leads or even a crack in the pane or a detachment of screen printing, if the electrochromic material is then relatively or highly colored the operator no longer is able to cause it to return to the colorless or slightly colored state within a short period of time. The operator can only wait for a self-discharge phenomenon of the system, a phenomenon which, happily for the kinetics, is extremely slow, taking at least several days, which tends to bring the electrochromic material of the electrode back into its equilibrium state, which corresponds to its almost completely colorless state. This self-discharging can have various causes, more or less well understood and intrinsic to the nature of the films used in the stack of the electrochromic system: it can conceivably be assumed that the electrolyte film, which is conducting for cations, is not a perfect electron insulator, for example. It is also possible to think of weak short-circuits between the electrically conducting films.

Now it may well prove to be important to be able to get back as rapidly as possible to the colorless state or virtually colorless state in the case where electrical supply fails. This is especially true when security may be at risk, when these electrochromic panes are to be fitted to vehicles, and notably to aircraft cockpits or drivers' cabs of railway locomotives, or even when these panes are used as rearview mirrors for automobiles.

SUMMARY OF THE INVENTION

Accordingly, one object of the present invention is to propose novel electrochromic panes which, in the case of a problem in the electrical supply, can return to a definitely decolored state in a very short time, for example at most several minutes.

According to the present invention, this objective is achieved by taking advantage of the phenomenon of self-discharge of the electrochromic panes. The present invention deliberately creates a permanent short-circuit between the two transparent electrically conducting films, so as to create a discharge for the electrochromic system when the cathodic electrochromic material is in its oxidized and colored state. This deliberately provoked "discharge" is certainly very much greater than, and out of all proportion to, the very slow self-discharge phenomenon frequently encountered in electrochromic systems. In parallel, the present invention has compensated for this electron transfer which tends to suppress the potential difference imposed upon the system by an appropriate electrical supply.

Thus, according to the present invention, when the film of cathodic electrochromic material is colored, if it happens that the electrical supply becomes defective and no potential difference can any longer be applied to the electrically conducting films, the discharge by short-circuit, which for this reason is no longer compensated, rapidly brings the electrochromic material back to its state of chemical stability, that is to say a decolored state, or at any rate very close to its maximum decolored state.

Therefore, two points are important for realizing the present invention: on the one hand to create a controlled discharge, and on the other hand to compensate for it by a suitable electrical supply.

The electrochromic pane according to the present invention comprises two glass sheets, each coated with a transparent electrically conducting film and separated from each other by an electrode of cathodic electrochromic material, an electrolyte and a counter-electrode. These electrically conducting films are connected, on the one hand, by supply leads to an electrical supply system which creates a potential difference adapted to the desired change of coloration of the electrochromic material. These electrically conducting films equipped with leads are, on the other hand, connected to each other at least at a portion of their periphery by means of an electron conducting material, the conductivity of which may, notably, lie between $10^{-1}$ and $10^{+3}$ ohm·cm$^{-1}$, and preferably be approximately $10^{+2}$ ohm$^{-1}$·cm$^{-1}$.

At the level of this conducting material, therefore, electrons pass directly from one electrically conducting film to the other, a passage which is fully controlled by the chosen conductivity of the material, its dimensional characteristics and, by the nature of its arrangement, the way in which it electrically connects together the electrically conducting films. It is thus possible to arrange this material so that it shall be in contact, at least partly, with at least two electrical supply leads.

It could, in fact, be represented in the form of a potential difference of opposite polarity to that imposed upon the electrically conducting films during the switching of the electrochromic material to a more colored state. In this way, this discharge is evaluated and accurately controlled.

An electron-conducting material may advantageously be constituted of a polymeric matrix, within which conducting particles are embedded. This polymeric matrix may thus be based upon butyl rubber and/or polyisobutylene, polysulphide or polyurethane, while the conducting particles may be chosen from among graphite particles, such as carbon black, acetylene black and/or metallic particles. Generally, the percentage by volume of these conducting particles in relation to the totality of the particles and the polymeric matrix is preferably between 10% and 20 %.

Thus it is readily possible to choose the electron conductivity of the material by proportioning the quantity of particles in relation to the quantity of polymer.

The full control of the discharge is also maintained by choosing the arrangement of this conducting material with respect to the electrically conducting films and their electrical supply leads.

In fact, if the potentiostat assembly recommended in the aforementioned European Patent Application EP-A-408 427 is used, each of the films is equipped with an electrical supply lead, the two diagonally opposite leads being arranged along the length of the electrochromic pane. There may also exist a lead designated as a reference point, the electrical potential imposed between the two supply leads enabling the desired potential between one of the leads and the reference point which is opposite it to be assured.

The preferred form of an embodiment of the present invention concerns a material of a polymeric substance present at the periphery of the pane and at the same time fulfilling the function of a seal against liquid and/or vapor; which seal, in any case, is used for protecting the stack of films of the electrochromic pane against aggressive action from outside. The material may thus contain, in addition to the conducting particles, a desiccant of the molecular sieve type. In this way the assembling of the pane is simplified. But this conducting material may also be disposed around the periphery of the pane only at suitably spaced zones.

In either case, it is necessary to ensure that an electrical connection exists between the two electrically conducting films, while at the same time preventing the creation of a definite short-circuit from one film to the other, which would damage the electrochromic system. Generally speaking, the value and the kinetics of the discharge are regulated by adjusting the conductivity of the conducting material and by the length of the "electrical path" which this material creates between one film and the other.

In order to compensate for, at least for the major part, this permanent discharge by electron transfer through this material, during the normal operation of the pane, it is necessary to adapt the potential difference imposed upon the electrically conducting films, both during a coloration or decoloration phase and during the maintenance of a given coloration of the electrochromic material.

It is both by the choice of the conducting material and of the electrical supply that it is then possible, according to the present invention, to effect a compromise according to the applications envisaged.

In fact, the more rapid a "return time" of the electrochromic pane to its decolored state in the case of a problem in the electrical supply is desired, the more it will be necessary to provide a material, the high conductivity and appropriate configuration of which will lead to a large discharge. However, this discharge phenomenon can be accentuated only up to a certain limit, because it is necessary in every case to adapt the power of the electricity supply for the pane, the normal functioning of which must not be perturbed.

As will be explained below, it is not always sufficient simply to apply a higher electrical voltage which would compensate for this discharge to some extent: taking into account the over-voltages at the interfaces, any oxido-reduction couple, such as $WO_3/IrO_y$ or $WO_3$/nickel oxide, has limits of electrochemical stability beyond which there is a risk of the materials deteriorating.

In practice, "maximum" voltage values are usually imposed, taking into account these intrinsic limits to the electrochromic system in order to obtain the maximum contrast between the colored state and the decolored state of the pane. To go beyond this point with a potentiostat assembly would run the risk of degrading the device and, at the start, the peripheral zones of the films of electrochromic materials. At the same time, however, inhomogeneities in coloration on the surface of the pane while it is being maintained notably in the colored state must not be created by an inadequate electrical supply.

Once "the return time" has been determined by the operator, the operator should therefore choose his most appropriate electrical supply as a function of the parameter which is considered the most important (saving of electrical energy, perfect homogeneity of surface or not, etc.) and of the electrochromic materials used in the pane.

With the system according to the present invention, the "return time" can thus easily be as short as the time required for the pane to pass from the colorless state to the colored state under the effect of the potential difference applied to its terminals.

To give an idea of the order of magnitude, this system enables a "return time" to the decolored state to be envisaged of the order of one minute for a rectangular pane of dimensions $40 \times 80$ cm$^2$, and of the order of at most several tens of seconds for a pane of $10 \times 18$ cm$^2$, or approximately the size of an automobile rearview mirror.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a simplified transverse section through the electrochromic panes according to the present invention;

FIG. 2 shows the development with time of the voltage applied during a coloration-decoloration cycle to an electrochromic pane according to the present invention.

DESCRIPTION OF THE PREFERRED EMBODIMENTS

Referring now to the drawings, wherein like reference numerals designate identical or corresponding parts throughout the several views, and more particularly to FIG. 1 thereof, which shows a cross-section through the electrochromic pane across its width, which pane is provided either with a stack of films causing it to function by insertion/de-insertion reactions of H+ protons or a stack of films causing it to function by insertion/de-insertion reactions of Li+ cations. For reasons of clarity, the ratios of the thicknesses of the various films are not to scale. Furthermore, the electrical supply circuit proper is shown only in a highly simplified form, and it may advantageously be that of the aforementioned European Patent Application, according to an assembly of the potentiostat type.

According to the present invention, the electrochromic pane is constituted by a stacked structure of two glass substrates 1, 2, of two transparent electrically conducting films 3, 4, of an electrode of a cathodic electrochromic material 5, of an electrolyte film 6 and of a counter-electrode 7 of an anodic electrochromic material. Two electrical supply terminals or leads 8 and 9 are provided for supplying the electrically conducting films 3, 4. These are diagonally opposite metal strips parallel to the length of the pane. A third terminal 10 is also provided and is termed a point of reference and is situated opposite the terminal 8. A seal 11 serves both as an electron conductor from one electrically conducting film to the other and as a mechanical seal for the assembly of the layers and films.

Across the electrical supply leads 8, 9 that are nearest together there is applied a voltage $U_1$, corresponding to a potential $U_2$ termed a set-point potential and measured between the supply lead 8 and the reference point 10, in accordance with Patent Application EP-A-408 427, to which reference should be made for more details.

In the preferred form of the embodiment shown in FIG. 1, the seal 11, which is at the same time conducting and ensures mechanical sealing, is disposed in such a way as to be in contact with the leads 8 and 9. However, it will be seen in FIG. 1 that the electrically conducting films 3, 4 are disposed along the length of the pane in such a way that the conducting seal 11 has, on the one hand, a wide contact area with the one of the electrically conducting films and, on the other hand, a wide direct contact area with the opposite glass substrate. During the deposition of the films 3, 4, this configuration can be obtained simply by the use of "masks". It is also recommended that this seal 11 should not simultaneously cover the supply lead 8 and the reference point 10. In this way, an "electrical path" is created between the electrically conducting films 3, 4 without however causing a sudden direct short-circuit leading to the deterioration of the system in the long term.

As an indication, the characteristics of each of the materials used in the various films of three stacks which may be utilized in the panes of FIG. 1 will now be stated.

EXAMPLE 1

The following stack operates by insertion/de-insertion of H+ protons at the position of the electrode 5 and of the counter-electrode 7, using a proton-conducting solid electrolyte 6:

glass substrates 1, 2: float glass sheets of 1.5 mm thickness, of dimensions $10 \times 18$ cm$^2$;

electrically conducting films 3, 4: indium oxide doped with tin, deposited by magnetron cathodic sputtering, thickness 400 nanometers and square resistance less than or equal to 5 ohms;

cathodic electrochromic material 5: tungsten oxide WO$_3$, deposited by reactive magnetron cathodic sputtering from a tungsten target in the presence of oxygen at a pressure of 20 millitorrs (or 2.66 Pa);

anodic electrochromic material 7: iridium oxide, deposited by magnetic field-assisted cathodic sputtering under a pressure of 6 millitorrs (or 0.8 Pa) of a gaseous mixture of oxygen/hydrogen in a ratio by volume of 80/20, the thickness being 55 nanometers;

electrolyte 6: solid solution of anhydrous phosphoric acid in polyoxyethylene, of thickness 50 micrometers, conductivity at 20° C. of about $9 \times 10^{-5}$ ohm$^{-1}$·cm$^{-1}$ and light transmission greater than 85%. It is prepared in the following manner: in anhydrous conditions, there are dissolved per liter of solvent, anhydrous phosphoric acid (21.5 g) and polyoxyethylene of molecular mass 5,000,000 (density 1.21; vitreous transition temperature $-40°$ C.; O/H ratio of the number of oxygen atoms of the polymer to the number of hydrogen atoms of the acid equal to 0.66). The solvent is a 60/40 mixture by volume of acetonitrile and tetrahydrofuran.

The solution is cast under an atmosphere having a controlled humidity (less than or equal to 50 ppm water) by the film-drawing method over the substrate covered with one or the other of the electrochromic material films. The solvent is then evaporated at ambient temperature under dry air for 20 hours.

EXAMPLE 2

The following stack functions by insertion/de-insertion of $Li^+$ cations in the electrode 5 and the counter-electrode 7, using an $Li^+$-conducting solid electrolyte 6:

The glass substrates 1, 2, the electrically conducting films 3, 4 and the electrode 5 are identical to those of Example 1.

- anodic electrochromic material 7: nickel oxide, deposited by magnetic field-assisted cathodic sputtering by operating on a thin nickel target at 250 V, with a plasma-producing gas at a pressure of 3.33 Pa and an oxygen/hydrogen ratio of 80/20, according to the teaching of Patent Application EP-A-0 373 020. The thickness of the film 7 is approximately 80 nm;
- electrolyte 6: solid solution of lithium perchlorate in polyethylene oxide, approximately 50 micrometers thick, according to Patent Application EP-A-0 013 199.

EXAMPLE 3

This is identical to Example 2, except that the nature of the electrolyte 6 is modified, this being in the form of a gel;

- electrolyte 6: lithium-conducting gel produced from a titanium alkoxide according to Patent Application FR-A-2 593 321.

In these three examples and according to the present invention, the seal 11 is of butyl rubber and/or polyisobutylene, in which particles of carbon black are dispersed. Its electron conductivity is between 1 and $10^3$ $ohm^{-1} \cdot cm^{-1}$ and in the present case preferably approximately $10^{+2} ohm^{-1} \cdot cm^{-1}$.

The percentage by volume of the particles of carbon black relative to the totality of the polymer and particles is from 10% to 20% and preferably from 14% to 18%.

The assembling of the panes according to Examples 1 to 3 is carried out, for example, according to the teaching of French Patent Application No. 90 11 419, filed on Sep. 14, 1990 and Corresponding to European Application EP-A-477 065. Before it creeps, this seal is in the form of a band of rectangular section $3 \times 4$ mm$^2$. It could also be of cylindrical section.

FIG. 2, which illustrates a graph showing, as a function of time, the potential difference $U_1(t)$ applied across the supply leads 8 and 9 during a complete coloration-decoloration cycle, will enable the functioning of the panes according to this invention to be explained (curves A, A') by comparison with that of the panes described in European Application EP-A-408 427 (curve B).

This graph distinguishes four phases x, y, z, t: phase x is the coloration phase, phase y is the phase of maintenance of the colored state, phase z is the decoloration phase and phase t is the phase of maintenance of the decolored state.

In known operation, that is to say when the panes are not provided with a conducting seal according to the present invention (curve B), during the coloration phase x, a voltage $U_1(x)$ is maintained at a plateau having a value of $-1.6$ volts if the stack of Example 1 is used; at a value of approximately $-2$ volts if the stack of Example 2 is used, and at a value of approximately $-1.8$ volts if the stack of Example 3 is used, these stacks being without the conducting seal 11 according to the present invention. Then, when the desired degree of coloration is achieved, the application of this voltage is stopped, the tungsten oxide is then maintained colored in phase y, a phase during which, if it is continued for several days, the tungsten oxide tends to return to a quasi decolorized state by a phenomenon of parasitic self-discharge.

In the decoloration phase z, a voltage $U_1$ is again imposed, but of inverse polarity at a plateau of $+0.6$ volts with the stack of Example 1, of $+1$ volt with the stack of Example 2, and of $+0.8$ volts with the stack of Example 3, all without the conducting seal 11. When the desired decolored state is obtained, the voltage returns to a zero value and the tungsten oxide is maintained in stable decolored phase t.

The functioning according to the present invention (curves A, A'), in which the stacks of Examples 1 to 3 are now used, provided with a conducting seal 11 according to FIG. 1, is different.

In the coloration phase x, a voltage $U_1(x)$ is applied for a same period of time $t_0$–$t_1$, just as before, in such a way that the limit of electrochemical stability of the electrochromic materials shall not be exceeded, at least at the position of their peripheral zones which are instantaneously subjected to this value of $U_1$ without any ohmic loss. But as a corollary, the coloration at the edges of the pane corresponding to its width will suffer a slight delay by comparison with the usual method of operation.

At the end of the coloration phase x, at time $t_1$, a slight inhomogeneity of coloration between the edges corresponding to the width and the remainder of the pane may persist, an inhomogeneity that is all the more difficult to discern if the conductivity of the seal 11 is not too high. Within the aforementioned conductivity range, this difference is scarcely perceptible and does not result in any notable disadvantage.

In phase y of coloration holding, between the times $t_1$ and $t_2$, it is now necessary, in order to maintain the degree of coloration indicated by the curve $At_1$, to apply a non-zero voltage $U_1(y)$ (FIG. 2) preferably close to the thermodynamic equilibrium voltage of the oxido-reduction couple in question, and notably for the couple $WO_3/IrO_y$, of approximately $-1.2$ V.

In decoloration phase z, the voltage $U_1(z)$ is equal to the voltage applied in the usual method of operation, for the same reasons as during the coloration phase x.

In phase t of holding in the decolored state, two possibilities are available: it is possible (curve A) to apply a zero voltage, the decolored phase corresponding to the stable electrochemical state of the system, or (curve A') to impose a non-zero voltage of approximately 0.2 to 0.3 volts, for example, continuously in such a way as to obtain a slightly greater decoloration.

With this electrochromic system, if a failure occurs in the electricity supply, the pane returns to a decolored state in less than 15 seconds. This decolored state is, however, slightly less clear than the decolored state obtained by applying the voltage $U_1(z)$ during the normal operating phase z (FIG. 2, curve B), since this auto-stability state of the oxido-reducing couple does not bring it back absolutely to its most transparent state. However, the visibility is broadly sufficient.

Thus, when the system discharges through its conducting seal in the case of a supply failure, it reaches a light transmission value $T_L$ of approximately 55%, whereas this value is slightly higher, at approximately 60%, when its decoloration takes place during its normal functioning. It will be remembered that when the electrochromic material is in its colored state, its light transmission $T_L$ decreases to 10%.

It will be evident that, although this graph represents one particular cycle, causing the material to pass from a totally decolored state to a totally colored state, the invention is applicable equally without difficulty to the passage from one degree of coloration to another, by applying a smaller voltage and/or using a shorter switching time. Similarly, the invention is not limiting to switching phases x and z where the voltage $U_1$ varies by plateaux in "on-off" manner. The difference lies, according to the present invention, in the fact that the electrical supply is adapted as a function of the caused and controlled discharge, and the choice of which depends upon the operator's requirements. Thus, a possible slight contrast in coloration between the edges and the remainder of the pane may be perceived as annoying, as indifferent (particularly if the edges are masked during the mounting of the pane on a building or a vehicle) or even as decorative. It should be added, in addition, that although in the case of the proton transfer stacks it is not desirable, within the framework of the present invention, to apply voltages $U_1(x)$ and $U_1(z)$ greater than those commonly applied so that there shall not be a risk of deterioration of the electrochromic materials at their periphery, in contrast in the case of stacks for the transfer of lithium cations $Li^+$, this point is less critical and it may be envisaged to apply slightly higher values (in absolute value) of voltages $U_1(x)$ and $U_1(z)$.

It could also readily be envisaged to apply a potential difference which takes account, not only of the short-circuit discharge through the electron conducting material of the present invention, but possibly also of the self-discharge intrinsic to the electrochromic systems which, although of much smaller value, could be perceived as annoying in the case where the panes are intended to remain colored for very long periods.

By the present invention, one disadvantage of the electrochromic systems is thus easily overcome: the blocking of the electrochromic material in its given coloration state in the case of a fault in the electrical supply, and to do this the invention advantageously makes use of a discharge phenomenon which until now has been considered as acting in opposition to satisfactory functioning of a usual electrochromic system.

It would be possible, without departing from the scope of the present invention, to apply the invention to an electrochromic system in which the electrochromic stability state corresponds, not to the decolored state, but to the colored state, the creation of the discharge thus making possible a return to the colored state in the case of an electrical supply breakdown.

The electrochromic pane according to the present invention thus finds applications both in the equipping of buildings by functioning in transmission, and for equipping vehicles of a train or aircraft type. In addition, it can operate in reflection, notably as a rearview mirror.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrochromic pane comprising:
   first and second glass sheets, each coated with a transparent electrically conducting film;
   a first electrode of electrochromic material formed on the first glass sheet;
   a counter-electrode of electrochromic material formed on the second glass sheet;
   an electrolyte formed between the first electrode and the counter-electrode;
   electrical supply leads for connecting the electrically conducting films to an electrical supply system generating a potential difference ($U_1$) as a function of a desired modification of a coloration state of at least one of the first electrode and the counter-electrode; and
   an electron conducting material connecting the electrically conducting films to each other at least at a portion of their periphery for creating a controlled short-circuit between the electrically conducting films, wherein the electron conducting material is filled between the first and second glass sheets by contacting the conducting films.

2. The electrochromic pane according to claim 1, wherein the electrical supply leads comprise two electrical leads and a reference point.

3. The electrochromic pane according to claim 1, wherein the electron conducting material comprises a polymeric matrix, in which electron conducting particles are embedded.

4. The electrochromic pane according to claim 3, wherein the polymeric matrix of the electron conducting material is based upon a compound selected from the group consisting of butyl rubber, polyisobutylene, polysulphide or polyurethane.

5. The electrochromic pane according to either of claims 3 or 4, wherein the conducting particles of the electron conducting material are selected from the group consisting of carbon black, acetylene black, or a metal.

6. The electrochromic pane according to either of claims 3 or 4, wherein a percentage by volume of the conducting particles relative to a totality of said particles and the polymeric matrix is from 10% to 20%.

7. The electrochromic pane according to either of claims 3 or 4, wherein the electron conducting material has an electron conductivity lying between $10^{-1}$ and $10^{+3}$ ohm$^{-1}$·cm$^{-1}$ and preferably of approximately $10^{+2}$ ohm$^{-1}$·cm$^{-1}$.

8. The electrochromic pane according to either of claims 3 or 4, wherein the electron conducting material connects together the two electrically conducting films over an entire area of a periphery of the electrochromic pane.

9. The electrochromic pane according to either of claims 3 or 4, wherein the electron conducting material is at least partly in contact with the electrical supply leads.

10. The electrochromic pane according to claim 7, wherein the electron conducting material further seals the electrochromic pane against liquid and vapor, and contains a desiccant of a molecular sieve.

11. The electrochromic pane according to claim 8, wherein the electron conducting material further seals the electrochromic pane against liquid and vapor, and contains a desiccant of a molecular sieve.

12. The electrochromic pane according to either of claims 3 or 4, wherein the potential difference ($U_1$) applied to the electrically conducting films during a coloration or decoloration phase of the at least one of the first electrode and the counter-electrode of electrochromic material or during a maintenance of a given coloration of the at least one of the first electrode and the counter-electrode of electrochromic material, is adapted so as to take account of electron transfer from the electrically conducting film coating the first glass sheet to the electrically conducting film coating the second glass sheet through the electron conducting material.

13. The electrochromic pane according to claim 10, wherein in a case of a defect or failure of applying the potential difference, the electron conducting material has a sufficient electron conductivity for an electrical connection which it assumes between the electrically conducting films coating the first and second glass sheets to cause a return of the at least one of the first electrode and the counter-electrode of electrochromic material to a decolored state in a period of time approximately equal to a time necessary for the at least one of the first electrode and the counter-electrode of electrochromic material to pass from the decolored state to a colored state under the application of a predetermined potential difference.

14. The electrochromic pane according to either of claims 3 or 4, wherein the potential difference ($U_1$) applied to the electrically conducting films coating the first and second glass sheets during phases of coloration and decoloration remains within limits of electrochemical stability of the at least one of the first electrode and of the counter-electrode of electrochromic material, in that said potential difference ($U_1$) applied during a holding phase in a colored state is close to a value of a thermodynamic equilibrium voltage of the at least one of the first electrode and the counter-electrode of electrochromic material.

15. The electrochromic pane according to any one of claims 1–4, wherein the electrochromic pane functions by insertion/de-insertion reactions of protons, the first electrode comprises tungsten oxide, the counter-electrode comprises iridium oxide and the electrolyte is a proton-conducting electrolyte of a solid solution of polyethylene oxide of phosphoric acid.

16. The electrochromic pane according to any one of claims 1 to 4, wherein the electrochromic pane functions by insertion/de-insertion reactions of lithium cations, the first electrode comprises tungsten oxide, the counter-electrode comprises nickel oxide and the electrolyte is conductive of lithium cations and is composed of a solid solution of lithium perchlorate and polyethylene oxide or is composed of a gel from a titanium alkoxide.

* * * * *